United States Patent Office 3,371,067
Patented Feb. 27, 1968

3,371,067
MELAMINE-FORMALDEHYDE-ACRYLONITRILE CONDENSATION PRODUCT AND PROCESS OF MAKING SAME
Ralph S. Anderson, Sheboygan, Wis., assignor to Plastics Engineering Company, Sheboygan, Wis., a corporation of Wisconsin
No Drawing. Filed Mar. 2, 1964, Ser. No. 348,802
17 Claims. (Cl. 260—67.6)

This invention relates to a condensation product of melamine, formaldehyde and acrylonitrile and the process for producing the same. More specifically, it relates to a process for the cyanoethylation of a melamine-formaldehyde reaction product by reaction with acrylonitrile and the process for preparing such cyanoethylated product.

For some time there has been a desire to have more plasticity in melamine-formaldehyde resins so as to give longer flow life and thereby permit quicker and possibly more complete filling of molds in which said resins are being cast or in which said resins are being used as the thermosetting binder. Attempts to modify such resins to improve this property have been unsuccessful, generally in that where there is such an improvement, other undesirable properties have been introduced into the resultant resin. For example, modification with phenol results in some improvement in the flow life, but introduces color instability in direct ratio to the amount of phenol used. Urea modification gives good color stability but introduces poor water resistance.

In accordance with the present invention it has been found that melamine-formaldehyde resins can be modified at an intermediate stage by cyanoethylation with acrylonitrile under alkaline conditions to give resins of improved plasticity and thereby better flow life. Surprisingly, a remarkable resistance to arcing is also noted for molded products made from the cyanoethylated resins of this invention.

In general the melamine-formaldehyde intermediate is one prepared by reacting at a pH of 8–10 and temperature of 70–95° C. a mixture of melamine and formaldehyde, the latter being added in a proportion of 2–5 moles per mole of melamine. The pH is maintained in the desired range by adding, originally to the aqueous formaldehyde and then to the formaldehyde-melamine mixture, small amounts of aqueous alkali, such as NaOH, NaHCO₃, Na₂CO₃, KOH, K₂CO₃, etc.

The acrylonitrile is added in a proportion of 0.5–6, preferably 0.5–2, moles per mole of melamine and is reacted under alkaline conditions, generally those resulting from the preparation of the intermediate resin. This reaction is advantageously conducted by refluxing at atmospheric pressure until the reflux temperature is substantially stabilized, generally within a period of 1–3.5 hours. Stabilization of the reflux temperature is regarded as effected when the reflux temperature remains constant for about one-half an hour.

The stabilization temperature is generally in the range of 85° to 100° C. at atmospheric pressure. Where desired, higher temperatures and pressure can be used to expedite the reaction. For example, a reaction period of 0.5 hour is appropriate with a temperature of 120° C. and autogenous pressure. In general a temperature in the range of 70–90° C., or even as high as 100° C. is advantageous with atmospheric pressure.

In a preferred modification, the melamine-formaldehyde intermediate is formed by reacting, under a pH maintained at 8–10, approximately 2.1 moles of formaldehyde per mole of melamine plus an additional 0.5–0.75 mole of formaldehyde for each mole of acrylonitrile eventually to be added. This is a ratio of reagents by which methylol groups are easily attached to the amine groups of the melamine. When such an intermediate is dehydrated by distilling water therefrom, the resin becomes extremely viscous. However, when acrylonitrile is reacted with this intermediate in accordance with this invention, water can be vaporized therefrom with relatively small increase in viscosity.

The acrylonitrile is preferably reacted in a proportion of 0.5–6, preferably 0.5–2, moles per mole of melamine in the resin. The resultant cyanoethylated resin cures under slightly acid condition in 15–120 seconds at 330° F. This product has an improved flow life and viscosity as compared to the melamine-formaldehyde resins and has at least as good color, and generally better color, upon testing at 150° C. (302° F.) for 1–2 hours.

Acrylonitrile does not appear to react with melamine per se in an aqueous alkali medium. The reaction proceeds after the melamine has been reacted with formaldehyde to introduce one or more methylol groups on the amino groups of the melamine.

It is believed that the acrylonitrile addition effects cyanoethylation of the melamine-formaldehyde intermediate reaction product primarily by virtue of replacing a hydrogen atom on the amine groups of the melamine. It is also possible, although believed much less likely that there is some cyanoethylation of the hydroxy groups in the methylol radicals attached to the amine groups. The acrylonitrile apparently adds at the double bond to the nitrogen (or oxygen) atom with the replaced hydrogen going to the other carbon atom of the double bond so as to give a product having cyanoethylated groups as illustrated by the following reaction:

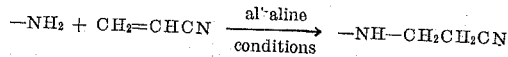

It is believed that in acrylonitrile addition alkaline conditions promote cyanoethylation whereas concentrated acid conditions, such as taught in Magat et al.: J. Amer. Chem. Soc. 73, 1035–37 (1951), promote addition at the nitrogen atom instead of the double bond so as to give an amide product with the ethylenic unsaturation preserved.

The alkaline conditions existing in the intermediate product after reaction of the melamine and formaldehyde are generally sufficient to promote the cyanoethylation. A pH of at least 7.5, advantageously one in the range of 8–11, is generally appropriate for the cyanoethylation.

In confirmation of the belief that cyanoethylation is effected, a bromine test of the acrylonitrile condensation product of the melamine-formaldehyde resin indicates that there is no ethylenic unsaturation. For example, such a product made using approximately 29% of acrylonitrile (based on the combined melamine and acrylonitrile weight) is dissolved in alcohol and water, and then treated with bromine water. The color of the bromine is prolonged in comparison with a similar test made with acrylonitrile in which case bromine loses its color by addition to the ethylenic unsaturation in the acrylonitrile in less than one hour.

The acrylonitrile is reacted with the melamine-formaldehyde intermediate instead of being polymerized through the ethylenic unsaturation. This is supported by the fact that polyacrylonitrile is highly insoluble and will not tolerate or remain suspended in aqueous solutions. However, with the condensation products of this invention, the reacted material tolerates the water of the initial aqueous formaldehyde solution and no insoluble polyacrylonitrile is precipitated from the solution.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

*Example I*

To a reaction vessel equipped with a stirrer and reflux condenser are added 126 parts of melamine and 170 parts of a 37% aqueous solution of formaldehyde containing 0.06 part of NaOH which gives a pH of 8–11. The temperature is raised and maintained at 70–90° C. and the pH is tested periodically and adjusted to 8–11 by the addition of aqueous alkali. At the end of one hour, acrylonitrile is added gradually until 318 parts has been added. The heating is continued until the reflux temperature is essentially stabilized at about 94° C. The resultant product shows a consumption of roughly 4.7 moles of acrylonitrile per mole of melamine. The reaction product, after dehydration to 120° C. under reduced pressure of 26″ Hg, is a clear, essentially water-white liquid, highly viscous at room temperature with a yield of 440 parts. Upon testing, this liquid shows no cure in 10 minutes at 330° F. However, upon mild acidification, such as with boric acid, it readily thermosets.

*Example II*

The procedure of Example I is repeated using the following proportions and conditions: 1,008 parts of melamine, 1,269 parts of 52% formaldehyde, 0.4 part of NaOH to give a pH of 8.5. The resultant mixture is heated at 90–95° C. until a clear solution is obtained (about 25–30 minutes) after which 0.4 part of NaOH is added to give a pH of 10. Then 424 parts of acrylonitrile is added gradually. The mixture is refluxed until stabilized at a temperature of 97° C. This temperature is reached at the end of 1 hour and 10 minutes, and the refluxing is continued for another ½ hour. The product is dehydrated at 26″ Hg until a temperature of 120° C. is reached and held for about one hour. The product is highly viscous, water white and represents a yield of 1915 parts. The bar melting point is 203° F., and the set time at 330° F. is 125 seconds without acidification.

*Example III*

Example II is repeated except that 1154 parts of 52% formaldehyde is used instead of the amount in Example II. The product has a bar melting point of 205° F. and the resultant set time at 330° F. is 105 seconds without acidification.

*Example IV*

The procedure of Example I is repeated using 882 parts of melamine, 1454 parts of 52% $CH_2O$, and 0.5 part NaOH. The mixture has a pH of 8.2 and is heated at 90–95° C. for 20 minutes at the end of which time 0.5 part of NaOH is added to give a pH of 9.7. Then 557 parts of acrylonitrile is added gradually, after which the mixture is refluxed for 3½ hours, at which time a stabilized reflux temperature of 86° C. is reached. The product is dehydrated at 26″ Hg to 120° C. to give a yield of 1890 parts of a water-white, viscous product having a melting point of 207° C. and a set time of 35 seconds at 330° F.

For the practice of this invention methacrylonitrile is considered to be an equivalent of acrylonitrile. When methacrylonitrile is substituted in equivalent amounts for the acrylonitrile and the preceding examples repeated, similar results are obtained. However, acrylonitrile is preferred. Moreover, since it has a smaller molecular weight, less of the acrylonitrile is required to produce the desired results.

Each of the products produced in Examples I–IV shows a marked improvement in moldability with greater plasticity, longer flow life and quicker filling of molds in comparison with corresponding melamine-formaldehyde resins not cyanoethylated.

The cyanoethylated resin products of this invention are clear, essentially colorless, resinous materials ranging from friable solids to viscous liquids at room temperature. They are capable of thermosetting under conditions of acidity as commonly encountered in the cure of urea-formaldehyde and melamine-formaldehyde condensation resins. Strong mineral acids, such as sulfuric acid, hydrochloric acid, etc. can be used to promote the cure, although weakly acidic materials, such as boric acid and aluminum silicates can be used and in many technological applications are preferred.

These products are soluble in the uncured condition in alcohol-water mixtures and can be used in the impregnation of paper, fabrics and fiber mats for the preparation of laminates in accordance with procedures generally used for such purposes. They can also be used as the binder material in admixture with cellulosic, mineral and other fillers, dyes, pigments, etc. to produce thermosetting molding compositions by processes well known in the art.

The cured resins are characterized by exceptional stability of color at temperatures up to 300° F. and under the action of ultra-violet light. Articles can be cured with good surface gloss and appearance. The cured products also have noteworthy and excellent resistance to arcing.

While the above examples and the description of the preparation of the melamine-formaldehyde intermediate product indicate a preference for completing this reaction before adding the acrylonitrile, it is also possible to add the acrylonitrile before the preparation of the intermediate is completed. In this way the melamine-formaldehyde condensation can be effected, particularly in the latter stages, simultaneous with the cyanoethylation. It is desirable, however, to have a substantial portion of the melamine-formaldehyde condensation effected before the addition of the acrylonitrile since the latter is not soluble in the mixture of melamine and formaldehyde.

A particularly suitable procedure is to add the melamine gradually to aqueous formaldehyde and immediately thereafter follow with the gradual addition of the acrylonitrile. By "gradual addition of acrylonitrile" it is meant here and elsewhere in the specification that the acrylonitrile is added as rapidly as the refluxing can accommodate or condense the acrylonitrile that is vaporized upon striking the hot reaction mass. Thus, the acrylonitrile is being added and the reaction initiated while some of the melamine is not yet condensed with the formaldehyde.

For example, the procedure of Example I can be repeated satisfactorily by starting with the aqueous solution of formaldehyde, adding the melamine and, immediately after the melamine addition is completed, commencing the gradual addition of acrylonitrile without the intermediate one hour heating period described in Example I. In this case, the mixture is generally refluxed at atmospheric pressure after the addition of the acrylonitrile to a temperature of 85–100° C. for stabilization as previously described.

Nevertheless, even though the acrylonitrile is not soluble in melamine and the methods of addition of the preceding paragraphs are preferred, it is possible to have some or all of the acrylonitrile present at the very earliest stage or intermediate stages of the melamine-formaldehyde condensation, even to add the melamine and acrylonitrile simultaneously. As indicated, the acrylonitrile is not immediately soluble in the melamine and must await at least partial condensation of the melamine and formaldehyde before sufficient solubility is obtained. In such cases, as the condensation progresses the acrylonitrile becomes dissolved in the condensation product and effects the cyanoethylation.

It is generally advantageous, however, to have at least about 50%, preferably at least about 75%, of the melamine-formaldehyde condensation effected before the addition of acrylonitrile is commenced.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of preparing a melamine-formaldehyde resin of improved flow characteristics comprising the steps of:
   (a) reacting melamine and formaldehyde at a pH of approximately 8–11 and at a temperature of 70–95° C., said formaldehyde being used in a proportion of 2–5 moles per mole of melamine, and
   (b) reacting the resultant melamine-formaldehyde reaction product with acrylonitrile in a proportion of 0.5–6 moles of acrylonitrile per mole of the melamine used in the preparation of said melamine-formaldehyde resin, said acrylonitrile reaction being conducted at a pH of at least 7.5 and by refluxing until a reflux temperature of at least 85° C. is reached.

2. The process of claim 1 in which the proportion of formaldehyde used in preparation of said resin is the sum of approximately 2.1 moles per mole of melamine used and an additional 0.5–0.75 mole of formaldehyde for each mole of acrylonitrile eventually added.

3. The process of claim 2 in which the proportion of acrylonitrile added is 0.5–2 moles per mole of melamine used.

4. The process of claim 1 in which the proportion of acrylonitrile is 0.5–2 moles per mole of melamine used.

5. The process of claim 1 in which said acrylonitrile reaction is conducted at a temperature in the range of 70–100° C. and at atmospheric pressure.

6. The process of claim 1 in which said acrylonitrile reaction is conducted by refluxing until a substantially constant reflux temperature is reached.

7. The process of preparing a melamine-formaldehyde resin of improved flow characteristics comprising the steps of:
   (a) reacting melamine and formaldehyde at a pH of approximately 8–11 and at a temperature of 70–95° C., said formaldehyde being used in a proportion equal to the sum of approximately 2.1 moles of formaldehyde per mole of melamine, plus an additional 0.5–0.75 mole of formaldehyde for each mole of acrylonitrile eventually to be added, and
   (b) reacting the resultant melamine-formaldehyde reaction product with acrylonitrile in a proportion of 0.5–2 moles of acrylonitrile per mole of the melamine used in the preparation of said melamine-formaldehyde resin, said acrylonitrile reaction being conducted at a pH of 8–11 and by refluxing until a temperature of at least about 85° C. is reached.

8. The process of claim 7 in which said refluxing is conducted until a substantially constant reflux temperature is reached.

9. The process of claim 1 in which said step (a) is conducted until at least 50% of said melamine has reacted with said formaldehyde before proceeding with step (b).

10. The process of claim 1 in which said reaction (a) has been effected to such a degree that at least 75% of said melamine has reacted with said formaldehyde before proceeding with step (b).

11. The process of claim 1 in which substantially all of said melamine has reacted with said formaldehyde before proceeding with step (b).

12. The process of claim 7 in which said step (a) is conducted until at least 50% of said melamine has reacted with said formaldehyde before proceeding with step (b).

13. The process of claim 7 in which said reaction (a) has been effected to such a degree that at least 75% of said melamine has reacted with said formaldehyde before proceeding with step (b).

14. The process of claim 7 in which substantially all of said melamine has reacted with said formaldehyde before proceeding with step (b).

15. The process of claim 7 in which at least a part of the acrylonitrile for reaction step (b) is present during the period o freaction step (a).

16. The process of claim 7, in which the melamine and acrylonitrile are added simultaneously to the reaction mass.

17. A cyanoethylated melamine-formaldehyde condensation product of improved plasticity prepared according to the process of claim 1.

References Cited

UNITED STATES PATENTS 2,476,065   7/1949   Robinson _____ 260—45.2

FOREIGN PATENTS 779,232   7/1957   Great Britain.

OTHER REFERENCES

Amino Resins, Blaid, 1959, page 8.

WILLIAM H. SHORT, *Primary Examiner.*

H. SCHAIN, *Assistant Examiner.*